(12) United States Patent
Park et al.

(10) Patent No.: US 12,179,783 B2
(45) Date of Patent: Dec. 31, 2024

(54) APPARATUS AND METHOD FOR PROVIDING EXTENDED FUNCTION TO VEHICLE

(71) Applicant: LG ELECTRONICS INC., Seoul (KR)

(72) Inventors: Nam Yong Park, Seoul (KR); Du Kyung Jung, Seoul (KR); Dong Kyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 17/753,421

(22) PCT Filed: Sep. 3, 2019

(86) PCT No.: PCT/KR2019/011347
§ 371 (c)(1),
(2) Date: Mar. 2, 2022

(87) PCT Pub. No.: WO2021/045246
PCT Pub. Date: Mar. 11, 2021

(65) Prior Publication Data
US 2022/0315033 A1 Oct. 6, 2022

(51) Int. Cl.
*B60W 50/14* (2020.01)
*B60W 40/02* (2006.01)
(Continued)

(52) U.S. Cl.
CPC ............ *B60W 50/14* (2013.01); *B60W 40/02* (2013.01); *G01C 21/36* (2013.01); *G06V 20/56* (2022.01); *B60W 2050/146* (2013.01)

(58) Field of Classification Search
USPC ........................................................ 348/148
See application file for complete search history.

(56) References Cited

U.S. PATENT DOCUMENTS 10,169,680 B1 * 1/2019 Sachdeva ............. G06V 20/653
11,004,426 B2 * 5/2021 Bronder ............... G01C 21/365
(Continued)

FOREIGN PATENT DOCUMENTS

JP       2008039642    2/2008
KR    1020040057691    7/2004
(Continued)

OTHER PUBLICATIONS

PCT International Application No. PCT/KR2019/011347, International Search Report dated Jun. 2, 2020, 2 pages.
(Continued)

*Primary Examiner* — Nigar Chowdhury
(74) *Attorney, Agent, or Firm* — LEE, HONG, DEGERMAN, KANG & WAIMEY

(57) ABSTRACT

Provided may be a method for providing an extended function to a vehicle according to an embodiment, the method comprising the steps of: obtaining first image information required for providing an extended function, through a first photographing unit; obtaining predetermined running information related to the running of a vehicle; performing image processing for providing an extended function, through a first ECU on the basis of the running information and the first image information; and displaying a result of the image processing. Furthermore, provided may be an extended function providing apparatus capable of performing the extended function providing method, and a non-volatile computer-readable recording medium in which a computer program for performing the extended function providing method is contained.

18 Claims, 7 Drawing Sheets

(51) Int. Cl.
*G01C 21/36* (2006.01)
*G06V 20/56* (2022.01)

(56) References Cited

U.S. PATENT DOCUMENTS

| | | | |
|---|---|---|---|
| 11,092,819 B2* | 8/2021 | Weller | H04N 13/351 |
| 11,501,244 B1* | 11/2022 | Hill | G06K 7/1413 |
| 2012/0226437 A1 | 9/2012 | Li et al. | |
| 2015/0245017 A1* | 8/2015 | Di Censo | H04N 13/204 |
| | | | 348/51 |
| 2018/0232956 A1 | 8/2018 | Jan Wyszka et al. | |
| 2019/0226866 A1 | 7/2019 | Chang | |
| 2023/0418424 A1* | 12/2023 | Shimizu | G06F 3/0446 |
| 2023/0421326 A1* | 12/2023 | Wang | H04L 5/0051 |
| 2023/0421327 A1* | 12/2023 | Ly | H04W 72/1268 |
| 2023/0421936 A1* | 12/2023 | Barthelmann | H04R 1/025 |

FOREIGN PATENT DOCUMENTS

| | | |
|---|---|---|
| KR | 1020070019813 | 2/2007 |
| KR | 2020110009855 | 10/2011 |

OTHER PUBLICATIONS

Korean Intellectual Property Office Application No. 10-2022-7010333, Office Action dated Mar. 4, 2024, 8 pages.

* cited by examiner

APPARATUS AND METHOD FOR PROVIDING EXTENDED FUNCTION TO VEHICLE

CROSS-REFERENCE TO RELATED APPLICATIONS

This application is the National Stage filing under 35 U.S.C. 371 of International Application No. PCT/KR2019/011347, filed on Sep. 3, 2019, the contents of which are all incorporated by reference herein in its entirety.

TECHNICAL FIELD

This disclosure relates to an apparatus which can perform addition or upgrading of an extended function without affecting a function of a system inserted into a vehicle in advance and a method thereof.

BACKGROUND ART

A driver may search a route to a destination and may be guided to a correct route to the destination through a navigation screen which displays a search result. In addition, while driving, the driver may be provided with a screen where the driver may see various pieces of information on a vehicle, at a glance. The various pieces of information provided to the driver may be displayed through various types of displays such as a display interworking with an infotainment system and a head-up display (HUD).

In addition, recently, the driver may understand more intuitively the displayed information by allowing the driver to experience extended reality (XR) in the vehicle. Thus, the matter in that the driver should look at the screen for a long time so as to understand the displayed information is reduced, and accordingly, a degree of interference with the driving of the driver is reduced.

Various types of information displayed on the display of the vehicle are acquired through respective cameras or sensors, and this is implemented through a system which outputs the various types of information after image processing in one electronic control unit (ECU). That is, one ECU implements functions such as image processing for displaying various pieces of information and image processing for implementing extended functions.

DISCLOSURE OF INVENTION

Technical Goals

Unlike a vehicle in the related art, all various functions of a recent vehicle are implemented using various electronic devices included in the vehicle, and these functions are being developed at a rapid pace. Accordingly, in order to newly implement newly developed functions, it may be necessary to replace various electronic devices included in the vehicle.

In the related art, an image processing function for displaying various pieces of information in a display of the vehicle has been integrated and performed in one electronic control unit (ECU). However, in this case, there are shortcomings in that complexity of the development of related software is increased, and functions being developed are mutually dependent so that parallel development is difficult.

In particular, recently, a great deal of electronic components attached to vehicles are connected to each other, and design changes occur so as to manage, upgrade, or add functions related to functions implemented through the connected electronic components so that there are a development burden and risk. In addition, since adding functions which are not provided in vehicles since are produced to the infotainment system or cluster system affect the existing implemented functions, a development time, a development cost, and risk are increased. In order to upgrade the existing functions implemented in the existing cluster system and infotainment system, it may be necessary to improve performance of an ECU. However, replacing a single ECU included in such a vehicle may be difficult for development in consideration of a relationship with various hardware which implements previously established functions.

In order to implement these additional functions in the existing vehicle, various devices are sold in the aftermarket. However, these devices may have restrictions such as requiring a separate space for additional mounting or installing after removing the existing system. In addition, in the case of products of the aftermarket, functionality is inferior in that various pieces of information managed by a system attached to a vehicle (for example, a moving speed of the vehicle, a steering angle of a steering wheel, inclination of the vehicle according to an inertial measurement unit (IMU) sensor, and the like) may not be utilized.

Therefore, it is required for an apparatus or a method capable of adding or upgrading an extended function which may use information managed in the existing system without affecting the existing functions in the existing system (a cluster system and an infotainment system).

Technical Solutions

According to an aspect, there is provided an apparatus for providing an extended function to a vehicle, which includes a first photographing part configured to acquire first image information necessary to provide an extended function, and a first electronic control unit (ECU) configured to perform image processing so as to provide the extended function on the basis of driving information acquired in relation to driving of a vehicle and first image information photographed through the first photographing part.

According to another aspect, there is provided a method of providing an extended function to a vehicle, which includes acquiring first image information necessary to provide an extended function through a first photographing part, acquiring predetermined driving information related to driving of the vehicle, performing image processing so as to provide an extended function through a first ECU on the basis of the driving information and the first image information, and displaying a result of the image processing.

According to still another aspect, there is provided a non-volatile computer-readable recording medium in which a computer program for performing a method of providing an extended function is recorded may be provided.

Effects

According to example embodiments, it is possible to easily perform adding an extended function to a vehicle or upgrading the extended function without affecting functions of an infotainment system and a cluster system which are already established in the vehicle.

According to example embodiments, it is possible to reduce a cost and a time required in a process of developing an extended function to be added to the vehicle.

BEST MODE FOR CARRYING OUT THE INVENTION

Figure 1:
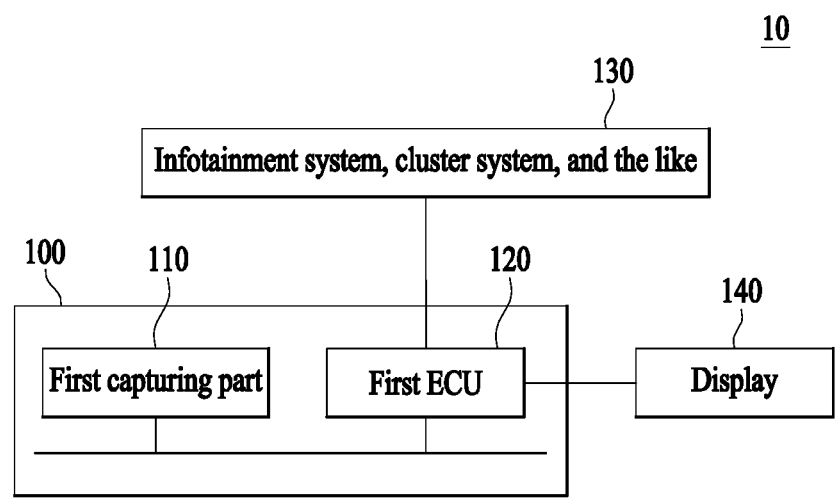
FIG. 1 is a block diagram illustrating components included in an apparatus for providing an extended function, which is mountable on a vehicle, according to an example embodiment.

According to an example embodiment, there may be provided an apparatus for providing an extended function to a vehicle, which includes a first photographing part configured to acquire first image information necessary to provide an extended function, and a first electronic control unit (ECU) configured to perform image processing so as to provide the extended function on the basis of driving information acquired in relation to driving of a vehicle and first image information photographed through the first photographing part.

According to an example embodiment, the first ECU of the apparatus for providing an extended function may be further configured to determine whether to provide the extended function on the basis of the first image information acquired through the first photographing part.

According to an example embodiment, when the first ECU of the apparatus for providing an extended function determines to not provide the extended function, the first ECU may be configured to determine to display second image information acquire through at least one second photographing part, and when the first ECU determines to provide the extended function, the first ECU may be configured to determine to display the first image information.

According to an example embodiment, when the first ECU determines to provide the extended function, the first ECU may be configured to perform processing for providing the extended function using the first image information and driving information including at least one among navigation route data, global positioning system (GPS) data, dead reckoning (DR)-GPS data, and controller area network (CAN) data.

According to an example embodiment, the first photographing part of the apparatus for providing an extended function may include a red, green, blue (RGB) camera and an infrared camera, and when an amount of ambient light of the vehicle is less than or equal to a predetermined amount of light, the first ECU may be configured to determine to display the first image information including at least partial infrared image information photographed through the infrared camera, and when the amount of the ambient light of the vehicle is greater than or equal to the predetermined amount of light, the first ECU may be configured to determine to display the first image information including the RGB image information photographed through the RGB camera.

According to an example embodiment, when the amount of the ambient light of the vehicle is less than or equal to the predetermined amount of light, the first ECU of the apparatus for providing an extended function may be configured to determine to display the first image information including the infrared image information photographed through the infrared camera and the RGB image information photographed through the RGB camera.

According to an example embodiment, the first ECU of the apparatus for providing an extended function may be configured to determine to display synthesized first image information such that the RGB image information is displayed around the infrared image information.

According to an example embodiment, the first ECU of the apparatus for providing an extended function may be configured to perform image processing so as to display the infrared image information in a portion in which a driving route of the vehicle is displayed.

According to an example embodiment, the first ECU of the apparatus for providing an extended function may be configured to determine whether to perform the extended function in response to a control signal received from the outside, perform image processing for providing the extended function on the basis of the driving information and the first image information photographed through the first photographing part according to the determination, or determine to display the second image information acquired through the at least one second photographing part.

According to an example embodiment, when the first image information is not acquired, the first ECU of the apparatus for providing an extended function may be configured to determine to display at least one of the driving information and the second image information acquired through the at least one second photographing part.

According to an example embodiment, the first ECU of the apparatus for providing an extended function may be configured to provide the extended function on the basis of the first image information through at least one of a head-up display (HUD) and an infotainment display.

According to an example embodiment, the extended function of the apparatus for providing an extended function may include at least one among virtual reality, augmented reality, mixed reality, vehicle to everything (V2X), and a monitoring function in an autonomous driving mode of the vehicle.

According to an example embodiment, there may be provided a method of providing an extended function to a vehicle, which includes acquiring first image information necessary to provide an extended function through a first photographing part, acquiring predetermined driving information related to driving of the vehicle; performing image processing so as to provide an extended function through a first ECU on the basis of the driving information and the first image information, and displaying a result of the image processing.

According to an example embodiment, the method of providing an extended function may further include determining, by the first ECU, whether to provide the extended function on the basis of the first image information acquired through the first photographing part.

According to an example embodiment, in the method of providing an extended function, the determining of whether to provide the extended function may include, when the first ECU determines to not provide the extended function, determining, by the first ECU, to display the second image information acquired through the at least one second photographing part.

According to an example embodiment, the method of providing an extended function may further include, when the first ECU determines to provide the extended function, determining, by the first ECU, to display the first image information.

According to an example embodiment, in the method of providing an extended function, the determining of whether to provide the extended function may include, when the first ECU determines to provide the extended function, determining, by the first ECU, to display the first image information.

According to an example embodiment, the method of providing an extended function may further include determining, when an amount of ambient light of the vehicle is less than or equal to a predetermined amount of light, to display the first image information including at least partial infrared image information photographed through an infrared camera, and determining, when the amount of ambient light of the vehicle is greater than the predetermined amount of light, to display the first image information including the RGB image information photographed through the RGB camera.

According to an example embodiment, in the method of providing an extended function, the determining of displaying the first image information may include determining, when the amount of the ambient light of the vehicle is less than or equal to the predetermined amount of light, to display the first image information including the infrared image information photographed through the infrared camera and the RGB image information photographed through the RGB camera.

According to an example embodiment, in the method of providing an extended function, the extended function may include at least one among virtual reality, V2X, and a monitoring function in an autonomous driving mode of the vehicle.

According to an example embodiment, there is provided a non-volatile computer-readable recording medium in which a computer program for performing a method of providing an extended function is recorded may be provided.

Hereinafter, example embodiments of the present disclosure will be fully described in detail, which is suitable for implementation by those skilled in the art to which the present invention pertains, with reference to the accompanying drawings. The present disclosure may be implemented in various different forms, and thus it is not limited to embodiments to be described herein.

As used herein, a suffix "part" for a component of the present disclosure are used or interchangeably used solely for ease of preparation of the specification, and do not have different meanings and each of them does not function by itself.

In order to clearly describe the present disclosure, some portions not related to the description will be omitted and not be shown, and the same reference numerals are given to the same or similar components throughout this disclosure. In addition, some example embodiments of the present disclosure will be described in detail with reference to the illustrative drawings. In giving reference numerals to components of the drawings, the same reference numerals may be given to the same components even though the same components are shown in different drawings. In addition, in describing the present disclosure, when a detailed description of related known configurations or functions is determined to obscure the gist of the present invention, the detailed description thereof will be omitted herein.

In describing components of the present disclosure, the terms first, second, A, B, (a), (b), and the like may be used. These terms are intended to distinguish one component from other components, but the nature, sequence, order, or number of the components is not limited by those terms. When arbitrary components are disclosed as "connected," "coupled," or "contacted" to other components, the arbitrary components may be directly connected or contacted to the other components, but it should be understood that another component could be "interposed" between the components and the other components or could be "connected," "coupled," or "contacted" therebetween.

In the present disclosure, it should be understood that the terms "include," "configured to," and "have" specify the presence of stated herein features, numbers, operations, actions, components, elements, or combinations thereof but do not preclude the presence or possibility of adding one or more other features, numbers, operations, actions, components, elements, or combinations thereof.

In addition, for convenience of description, in implementing the present disclosure, the components may be subdivided and described, and alternatively, these components may be implemented in one device or module, or one component may be implemented by being divided into a plurality of devices or modules.

Before describing various example embodiments of the present disclosure, main terms will be described as follows.

"Self-driving or autonomous-driving" refers to a technology that drives itself, and an autonomous driving vehicle refers to a vehicle which travels without user manipulation or with minimal user manipulation.

For example, autonomous driving may include all of technology for maintaining a driving lane, technology for automatically controlling a speed such as adaptive cruise control, technology for automatically driving along a predetermined route, and technology for automatically setting a route when a destination is set.

The vehicle may collectively include all of a vehicle having merely an internal combustion engine, a hybrid vehicle having an internal combustion engine and an electric motor together, and an electric vehicle having merely an electric motor and may include not only a vehicle but also a train and a motorcycle.

In this case, the autonomous vehicle may be regarded as a robot having an autonomous driving function.

"Extended reality" (XR) collectively refers to virtual reality (VR), augmented reality (AR), and mixed reality (MR). A VR technology is a computer graphic (CG) technology for providing merely CG images of objects or backgrounds in the real world, an AR technology is a CG technology for providing virtual CG images on images of real objects, and an MR technology is a CG technology for mixing, combining, and providing virtual objects in the real world.

According to an example embodiment, the ER may be understood to correspond to an extended function which may be provided to the vehicle of the present disclosure.

The MR technology is similar to the AR technology in that the MR technology shows both real objects and virtual objects. However, there is a difference in that in the AR technology, a virtual object is used in a form for complementing a real object, whereas in the MR technology, a virtual object and a real object are used with equal characteristics.

The XR technology may be applied to a head-mount display (HMD), a HUD, a mobile phone, a tablet personal computer (PC), a laptop, a desktop, a television (TV), and digital signage, and a device to which XR technology is applied may be referred to as an XR device.

Hereinafter, various example embodiments of the present disclosure will be described with reference to the accompanying drawings.

FIG. 1 is a block diagram illustrating components included in an extended function providing device 100 which is mountable on a vehicle 10 according to an example embodiment.

According to an example embodiment, the extended function providing device 100 may include a first photographing part 110 and a first ECU 120.

According to an example embodiment, the first photographing part 110 may be configured to acquire first image information necessary to provide an extended function. According to an example embodiment, image information acquired through the first photographing part 110 may be utilized in a process of providing various extended functions to the vehicle 10. According to an example embodiment, the number of first photographing parts 110 may be varied according to a type of extended function provided to the vehicle 10. According to an example embodiment, at least one first photographing part 110 may be used. According to an example embodiment, the first photographing part 110 may be dedicated to an extended function to be implemented through the first ECU 120.

According to an example embodiment, the first ECU 120 may be configured to perform image processing so as to provide an extended function on the basis of driving information acquired in relation to driving of the vehicle 10 and first image information photographed through the first photographing part 110. According to an example embodiment, the first ECU may be regarded as a dedicated ECU for an extended function and may include at least one processor. According to an example embodiment, the first ECU 120 may include at least one ECU according to a type of extended function provided to the vehicle 10.

According to an example embodiment, the extended function providing device 100 may further include an additional component for performing an extended function to be provided. According to an example embodiment, the extended function providing device 100 may further include a component of a separate additional display (for example, an HUD) in addition to a display (for example, an infotainment display) already installed in the vehicle 10.

Figure 2:
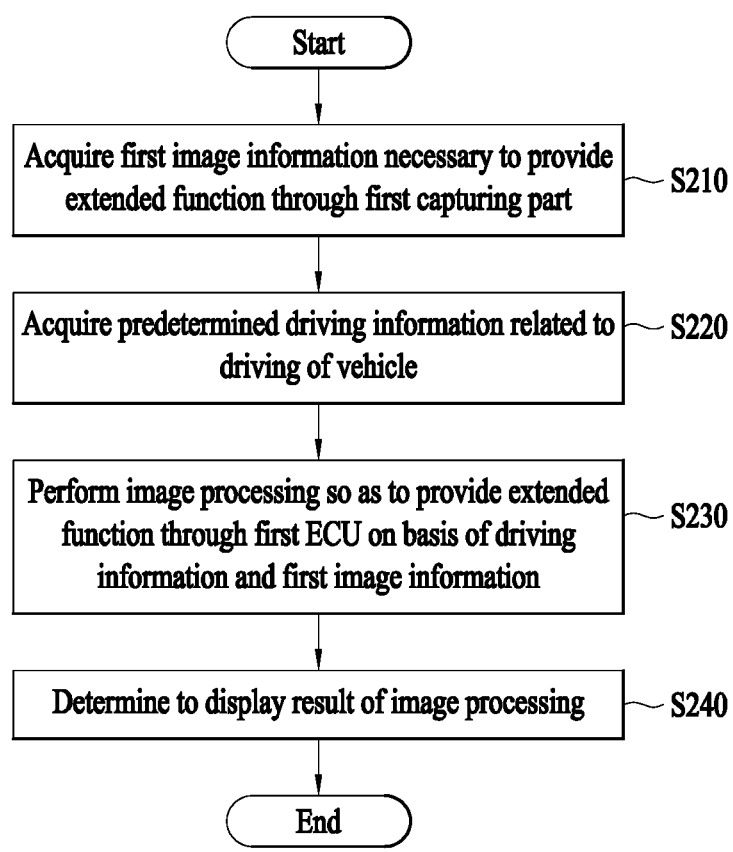
FIG. 2 is a flowchart illustrating a method of providing an extended function according to an example embodiment.

FIG. 2 is a flowchart illustrating a method of providing an extended function, which is capable of being performed by the extended function providing device 100 according to an example embodiment.

In operation S210, the extended function providing device 100 may acquire first image information necessary to provide an extended function through the first photographing part 110 according to an example embodiment. According to an example embodiment, the first image information acquired through the first photographing part 110 may be used to implement various extended functions related to a predetermined image through the first ECU 120.

In operation S220, the extended function providing device 100 may acquire predetermined driving information related to driving of the vehicle 10 according to an example embodiment. According to an example embodiment, the extended function providing device 100 may acquire various types of pieces of driving information necessary to implement the extended function from the vehicle 10 being running. For example, the driving information of the first ECU may include at least one among navigation route data, GPS data, DR-GPS data, and CAN data. According to an example embodiment, the first ECU 120 of the extended function providing device 100 may acquire the driving information from another system 130 (for example, an infotainment system or a cluster system) included in the vehicle 10.

According to an example embodiment, when the extended function which is capable of being provided by the extended function providing device 100 is an AR function, the extended function providing device 100 may provide the extended function using driving information (for example, navigation route data, GPS data, DR-GPS data, and CAN data) acquired from the another system 130.

In operation S230, the extended function providing device 100 may perform image processing so as to provide the extended function through the first ECU 120 on the basis of the driving information and the first image information according to an example embodiment.

According to an example embodiment, the extended function providing device 100 may provide the extended function, which may be provided through the first photographing part 110 and the first ECU 120, using not only the first image information photographed through the first photographing part 110 but also the predetermined driving information related to the driving of the vehicle 10. According to an example embodiment, the predetermined driving information related to the driving of the vehicle 10 may be acquired from an external system interworking with the extended function providing device 100.

According to an example embodiment, the extended function providing device 100 may provide the extended function by displaying the first image information and the driving information together. According to an example embodiment, the first ECU 120 may interwork with an external system and may further provide an extended function, which may be provided by the first ECU 120, in addition to a function which may be previously implemented by the external system. That is, the first ECU 120 may acquire merely various pieces of the driving information necessary for the implementation of the extended function by the first ECU 120 and use the various pieces of the driving information to perform image processing without affecting the existing functions of the external system.

According to an example embodiment, the image processing capable of being performed by the first ECU 120 may be understood as arbitrary image processing required for various functions capable of being implemented by those skilled in the art using the image information and the driving information.

In operation S240, the extended function providing device 100 may determine to display a result of the image processing performed in operation S230 according to an example embodiment.

According to an example embodiment, the first ECU 120 may be connected to a predetermined display capable of displaying the result of the image processing performed in operation S230. The first ECU 120 may determine that the predetermined display displays the result of the image processing to transmit data on the result of the image processing to the predetermined display. According to an example embodiment, the first ECU 120 may be connected to an external system such as an infotainment system or a cluster system, and the predetermined display may be an infotainment display or an HUD included in the external system. According to an example embodiment, in order to display the result of the image processing, the first ECU 120 may transmit the data on the result of the image processing to the external system.

Figure 3:
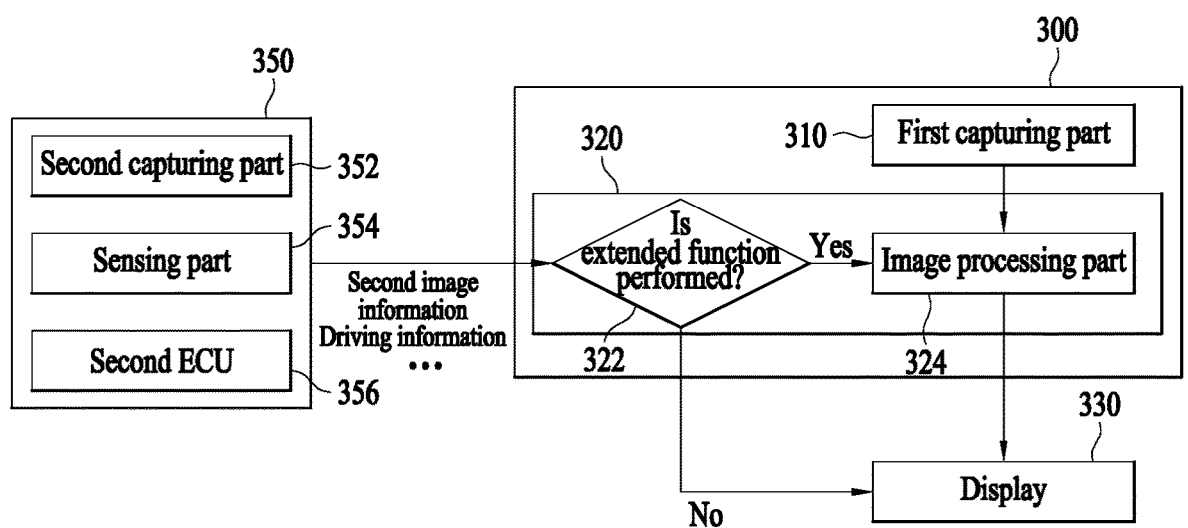
FIG. 3 is a diagram illustrating a relationship between components interworking with an apparatus for providing an extended function according to an example embodiment.

FIG. 3 is a diagram illustrating a relationship between components interworking with an extended function providing device 300 according to an example embodiment. The extended function providing device 300 of FIG. 3 corresponds to the extended function providing device 100 of FIG. 1.

According to an example embodiment, the first ECU 320 may implement an extended function using first image information acquired through a first photographing part 310. According to an example embodiment, driving information acquired from an external system 350 may be used to implement the extended function of the first ECU 320.

According to an example embodiment, the external system 350 may include at least one second photographing part 352 which is distinguished from the first photographing part 310. According to an example embodiment, second image information photographed by the second photographing part 352 may be image information irrelevant to the extended function to be implemented through the first ECU 320.

According to an example embodiment, the external system 350 may include a sensing part 354 for acquiring various pieces of information while the vehicle 10 is traveling. According to an example embodiment, the sensing part 354 may acquire at least one among internal information of the vehicle 10, surrounding environment information of the vehicle 10, and driver information using various sensors.

According to an example embodiment, sensors included in the sensing part 354 include a proximity sensor, an illuminance sensor, an acceleration sensor, a magnetic sensor, a gyro sensor, an inertial sensor, an RGB sensor, an infrared (IR) sensor, a fingerprint recognition sensor, an ultrasonic sensor, an optical sensor, a microphone, light detection and ranging (LiDAR), radio detecting and ranging (RADAR), and a temperature sensor.

According to an example embodiment, the external system 350 may include a second ECU 356. According to an example embodiment, the second ECU 356 included in the external system 350 executes various data processing, image processing, and control functions so as to perform the existing functions implemented in the vehicle 10 in addition to the extended function capable of being provided by the first ECU 320.

According to an example embodiment, the first ECU 320 may include an image processing part 324 which performs image processing using the first image information photographed by the first photographing part 310 and the driving information acquired from the external system 350.

According to an example embodiment, the first ECU 320 may determine whether to perform the extended function (322). According to an example embodiment, the first ECU 320 may determine whether to perform the extended function on the basis of control signals (for example, a touch input signal, a click signal, and a voice input signal) received from the outside (322).

According to an example embodiment, when the first ECU 320 determines to perform the extended function, the first ECU 320 may perform image processing for providing the extended function on the basis of the driving information acquired from the external system 350 and the first image information acquired through the first photographing part 310. The first ECU 320 may determine to display a result of the image processing on the display 330.

According to an example embodiment, when the first ECU 320 determined to not perform the extended function, the first ECU 320 may perform the existing function on the basis of at least one of the driving information and the second image information acquired through at least one second photographing part 352 of the external system 350 instead of the first image information photographed by the first photographing part 310. According to an example embodiment, the first ECU 320 may determine whether to output the second image information received from the external system 350 or whether to perform the extended function by displaying the result of the image processing on the basis of the first image information. According to an example embodiment, the first ECU 320 may determine to display the result of the image processing on the basis of the first image information and the driving information so as to perform the extended function on the basis of the control signals received from the outside or may determine to display second image information so as to perform the existing function and may transmit data to be displayed to the display 330.

Figure 4:
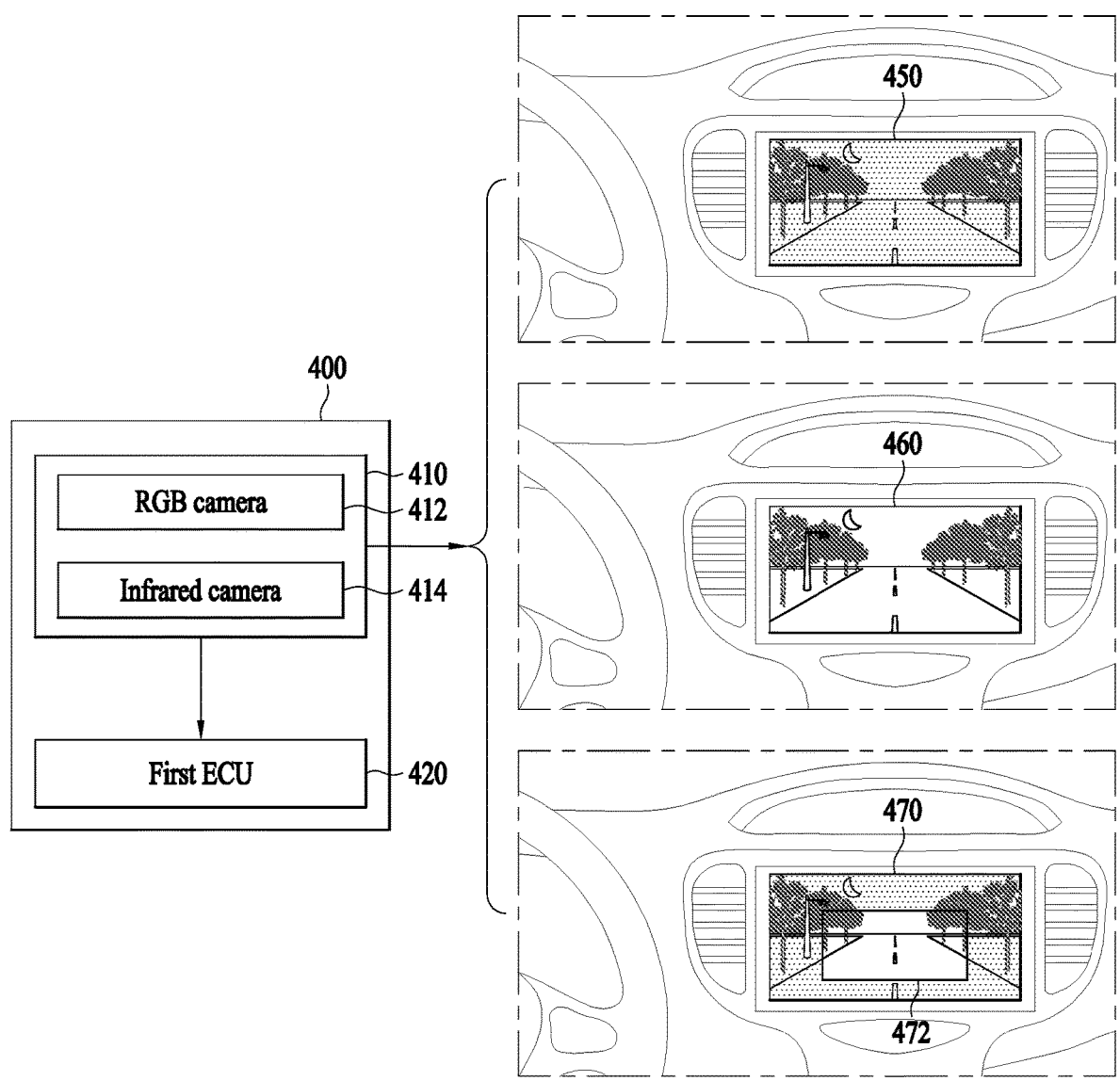
FIG. 4 is a diagram illustrating a feature in which the apparatus for providing an extended function is capable of implementing the extended function in various forms in a display depending on an amount of light around the vehicle according to an example embodiment.

FIG. 4 is a diagram illustrating a feature in which an extended function providing device 400 is capable of implementing the extended function in various forms in a display depending on an amount of light around the vehicle 10 according to an example embodiment. The extended function providing device 400 of FIG. 4 may correspond to the extended function providing device 100 of FIG. 1.

According to an example embodiment, a first photographing part 410 included in the extended function providing device 400 may include at least one of an RGB camera 412 and an infrared camera 414. According to an example embodiment, a first ECU 420 may perform image processing on the basis of first image information acquired from the first photographing part 410, thereby providing an extended function.

According to an example embodiment, the first ECU 420 may determine whether an amount of ambient light of the vehicle 10 is less than or equal to a predetermined amount of light. According to an example embodiment, when the amount of ambient light of the vehicle 10 is less than or equal to the predetermined amount of light, the first ECU 420 determines to display the first image information including at least partial of infrared image information 460 photographed by an infrared camera 414. According to an example embodiment, when the amount of ambient light of the vehicle 10 is greater than the predetermined amount of light, the first ECU 420 determines to display the first image information including an RGB image information 450 photographed by the RGB camera 412.

Referring to FIG. 4, according to an example embodiment, when the amount of ambient light of the vehicle 10 is less than or equal to the predetermined amount of light, the first ECU 42 may perform image processing using the RGB image information 450 photographed through the RGB camera 412 and transmit a result of the image processing result to the display so as to display the result. According to an example embodiment, when the amount of ambient light of the vehicle 10 is greater than the predetermined amount of light, the first ECU 42 may perform the image processing using the infrared image information 460 photographed through the infrared camera 414 and transmit a result of the image processing to the display so as to display the result.

According to an example embodiment, in order to determine whether to provide the extended function on the basis of which image information of the RGB image information 450 and the infrared image information 460, the first ECU 420 may use various pieces of information such as time information (for example, using the infrared image information 460 at a predetermined time) and route information (for example, using the infrared image information 460 when passing through a tunnel).

Figure 5:
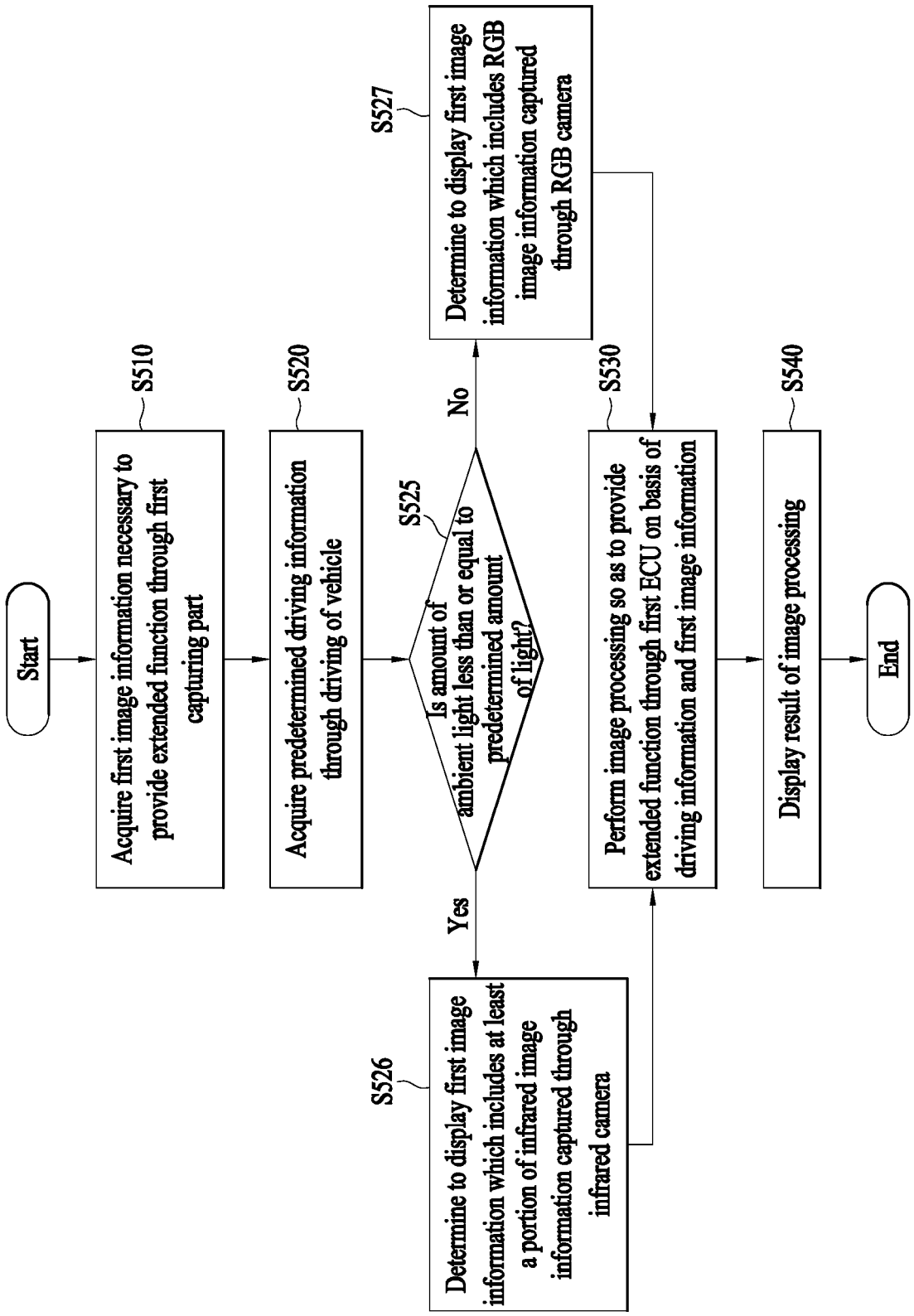
FIG. 5 is a flowchart illustrating a method of providing an extended function, which provides an extended function using infrared image information or red, green, blue (RGB) image information on the basis of an amount of ambient light according to an example embodiment.

FIG. 5 is a flowchart illustrating a method of providing an extended function, which provides the extended function using the infrared image information or the RGB image information on the basis of the amount of ambient light according to an example embodiment. Operations S510, S520, S530, and S540 of FIG. 5 may correspond to operations S410, S420, S430, and S440 of FIG. 2, and thus detailed descriptions thereof will be omitted herein.

In operation S525, the extended function providing device 400 may determine whether the amount of ambient light of the vehicle 10 is less than or equal to a predetermined amount of light.

When it is determined in operation S525 that the amount of ambient light is less than or equal to the predetermined amount of light, in operation S526, the extended function providing device 400 may determine to display the first image information which includes at least a portion of the infrared image information 460 photographed through the infrared camera 414 according to an example embodiment.

When it is determined in operation S525 that the amount of ambient light is greater than the predetermined amount of light, in operation S527, the extended function providing device 400 may determine to display the first image information which includes RGB image information 470 photographed through the RGB camera 412 according to an example embodiment.

In operation S530, on the basis of driving information and the first image information determined to be displayed in operation S526 or S527, the extended function providing device 400 may perform image processing for providing the extended function according to an example embodiment.

According to an example embodiment, the first ECU 420 may perform the image processing using both of the RGB image information 450 and the infrared image information 460 acquired by the first photographing part 410, thereby providing the extended function. According to an example embodiment, when the amount of ambient light of the vehicle 10 is less than or equal to the predetermined amount of light, the first ECU 420 may determine to display the first image information including infrared image information 472 photographed by the infrared camera 414 in addition to the RGB image information 470 photographed through the RGB camera 412.

Referring to FIG. 4, the first ECU 420 may perform the image processing such that the infrared image information 472 is displayed in the vicinity of a central portion of a screen and the RGB image information 470 is displayed at the surroundings of the infrared image information 472. According to an example embodiment, when the extended function provided from the first ECU 420 is an AR function, a portion in which a road displayed as an actual driving path on the display should be brightly displayed in a situation in which the amount of ambient light is less than or equal to the predetermined amount of light. Therefore, the first ECU 420 may perform the image processing such that the infrared image information 472 is displayed in the portion in which the actual driving route is displayed, and the remaining portion in which the RGB image information 470 is displayed.

Figure 6:
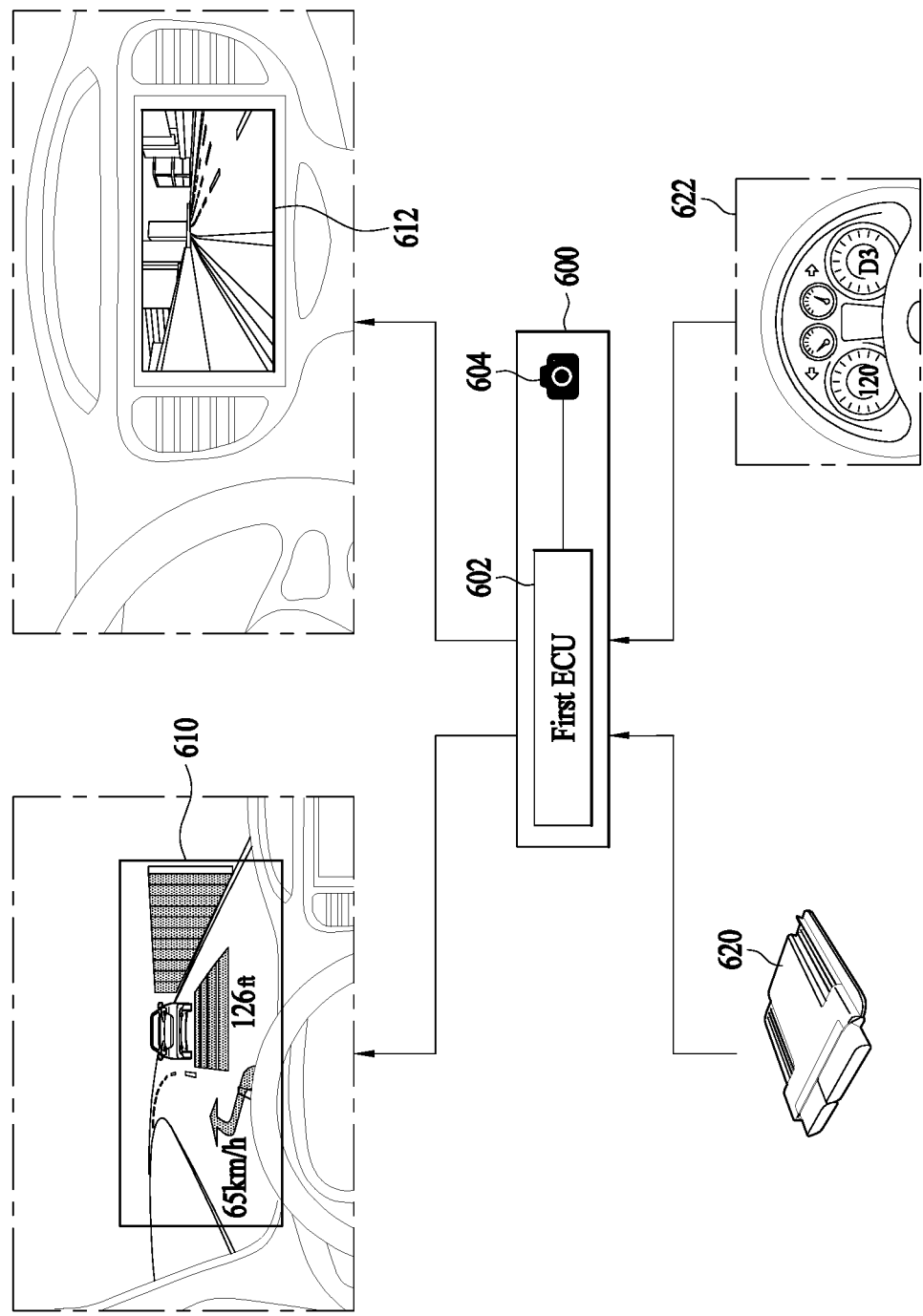
FIG. 6 is a diagram illustrating a procedure in which an apparatus for providing an extended function implements an extended function through an infotainment display and a head-up display (HUD) according to an embodiment.

FIG. 6 illustrates a procedure in which an extended function providing device 600 implements an extended function through an infotainment display 612 and an HUD 610 according to an example embodiment. The extended function providing device 600 of FIG. 6 may correspond to the extended function providing device 100 of FIG. 1.

According to an example embodiment, the extended function providing device 600 is capable of interworking with an external system (for example, an infotainment system 620 or a cluster system 622) which are driven in vehicle 10. According to an example embodiment, the infotainment system 620 may interwork with an infotainment display 612 for displaying data processed through the infotainment system 620. According to an example embodiment, the infotainment system 622 may be interworked with the HUD 610 for displaying the data processed through the cluster system 622. According to an example embodiment, the infotainment system 620 and the cluster system 622 are interworked with both of the infotainment display 612 and the HUD 610 to organically display the data processed in each system in at least one of the infotainment display 612 and the HUD 610.

Referring to FIG. 6, the extended function providing device 600 may perform image processing using first image information acquired through a first photographing part 640 and driving information acquired from the external systems 620 and 622, thereby displaying a screen on which the extended function is implemented in at least one type of the displays 610 and 612. According to an example embodiment, in order to display the image-processed data on the infotainment display 612, a first ECU 602 of the extended function providing device 100 may transmit the image-processed data to the infotainment display 612 or the infotainment system 620. According to an example embodiment, when the HUD 610 is mounted on the vehicle 10, in order to display a result of the image processing on at least one of the infotainment display 612 and the HUD 610, the first ECU 602 may transmit the image-processed data to at least one of the infotainment system 620 and the cluster system 622. According to an example embodiment, in order to selectively display the image-processed data in either of the infotainment display 612 or the heads-up display 610, the first ECU 602 may transmit the image-processed data to one of the infotainment system 620 and the cluster system 622.

According to an example embodiment, the first ECU 602 may determine which display of the infotainment display 612 and the HUD 610 is to display the image-processed data on the basis of control signals received from the outside.

Figure 7:
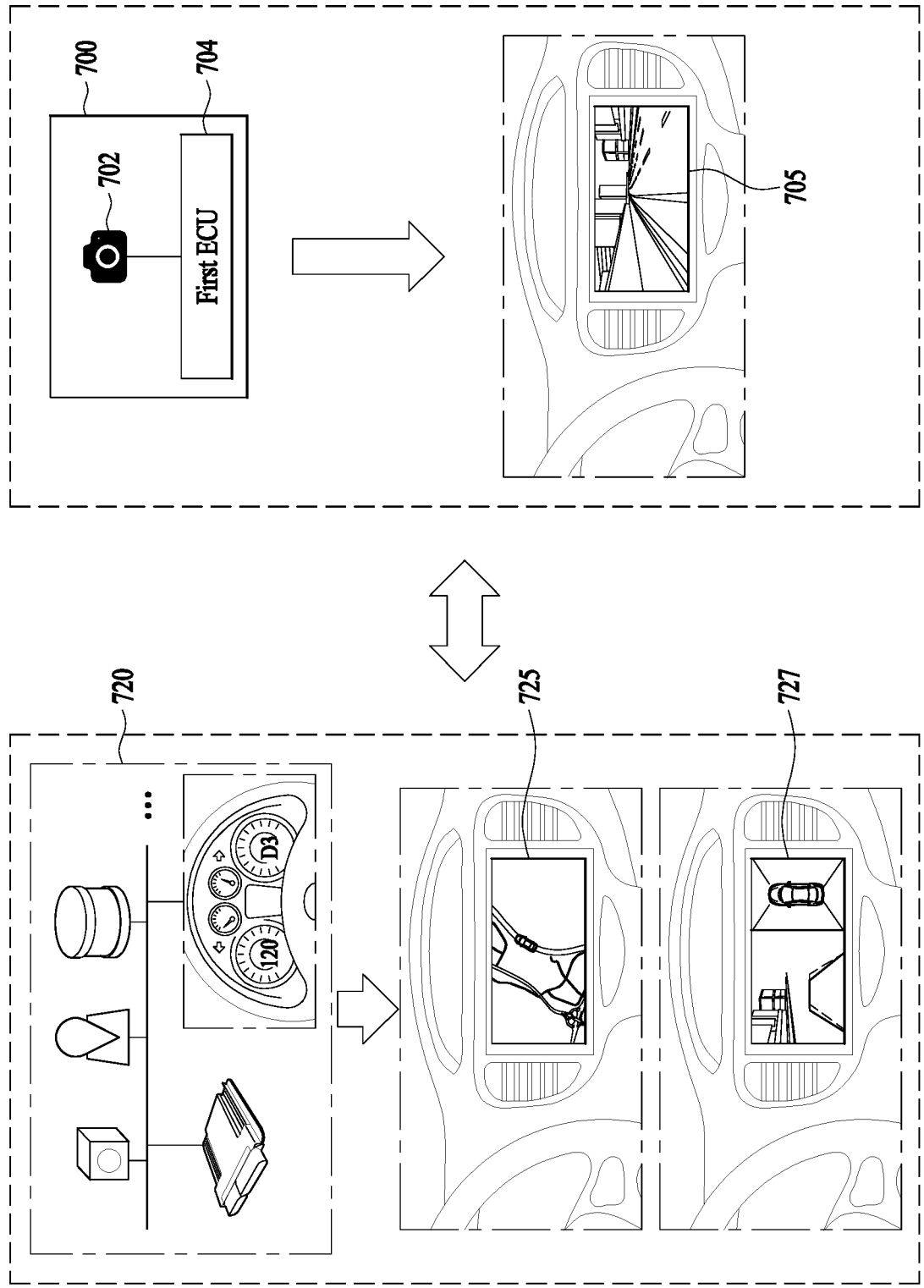
FIG. 7 is a diagram for describing a change procedure between a function implemented through the apparatus for providing an extended function and a function implemented through the existing system according to an example embodiment.

FIG. 7 is a diagram for describing a change procedure between a function implemented through an extended function providing device 700 and a function implemented through the existing system according to an example embodiment. According to an example embodiment, the extended function providing device 700 of FIG. 7 may correspond to the extended function providing device 100 of FIG. 1.

According to an example embodiment, a first ECU 704 of the extended function providing device 700 may provide an extended function on the basis of first image information acquired through a first photographing part 702. According to an example embodiment, the extended function may be an AR function. When the first ECU 704 determines to perform the AR function, in order to display an image in which the AR function is implemented on at least one display interworking with the first ECU 704, image processing on the basis of the first image information may be performed. The first ECU 704 may transmit image-processed data to the display so as to display a screen on which the extended function is implemented (for example, a navigation screen 705 implemented using the AR function) is displayed on the display.

According to an example embodiment, when the extended function is not performed by the extended function providing device 700 and the existing function is performed, various functions implemented by the external system 720 instead of the extended function providing device 700 may be implemented on the display. According to an example embodiment, the external system 720 may implement a navigation function on the display on the basis of acquired GPS information and map information (for example, 725). According to an example embodiment, the external system 720 may implement a side view function, a rear view function, and a surround view function, which show the surroundings of the vehicle 10 (for example 727), on the display on the basis of second image information acquired through at least one second photographing part.

According to an example embodiment, various functions may be selected and appropriately executed through an exchange between functions implementable in the vehicle 10 (750). According to an example embodiment, among various functions capable of being implemented on the infotainment display interworking with the infotainment system, since the extended function capable of being provided through the extended function providing device 700 is executed, data which undergoes the image processing of the first image information acquired through the first photographing part 702 may be displayed on the display. Then, when it is determined that a function provided by the external system 720 is executed, the first ECU 704 may terminate the execution of the extended function, and the external system 720 may implement one among the existing functions determined to be executed on the display.

It may be understood that the above-described features of the present disclosure through the various example embodiments correspond to various examples for convenience of description of the features of the present disclosure described in the appended claims. Therefore, the features of the present disclosure should not be construed as being limited to the contents disclosed in the above-described example embodiments or the accompanying drawings.

An artificial intelligence (AI) technology is applied to the vehicle 10, and thus the vehicle 10 may be implemented as a mobile robot, a vehicle, or an unmanned aerial vehicle.

The vehicle 10 may include an autonomous driving control module for controlling an autonomous driving function, and the autonomous driving control module may refer to a software module or a chip which is implemented as hardware. The autonomous driving control module may be included in the vehicle 10 as a component and may be configured as separate hardware outside the vehicle 10 and connected to the vehicle 10.

Bu using pieces of sensor information acquired from various types of sensors, the vehicle 10 may acquire state information on the vehicle 10, detect (recognize) surrounding environments and objects, generate map data, determine a movement route and a traveling plan, or an action.

Here, in order to determine the movement route and the traveling plan, the vehicle 10 may use sensor information acquired from at least one sensor among Lidar, Radar, and a camera.

In particular, the vehicle 10 may receive sensor information from external devices to recognize an area where a field of view is obscured or an environment or object with respect to an area over a predetermined distance by receiving sensor information from external devices or may receive information directly recognized by the external devices.

The vehicle 10 may perform the above operations using a learning model consisting of at least one artificial neural network. For example, the vehicle 10 may recognize a surrounding environment and an object using a learning model and may determine a traveling route using information on the recognized surrounding environment or the recognized object. Here, the learning model may be directly learned in the vehicle 10 or may be learned from an external device such as an AI server.

In this case, the vehicle 10 may generate a result using a direct learning model and perform an operation, and alternatively, may perform an operation by transmitting sensor information to an external device such as an AI server and receiving a generated result.

The vehicle 10 may determines a moving path and a traveling plan using one or more among map data, object information detected from the sensor information, and object information acquired obtained from an external device and control a driving unit, thereby driving the vehicle 10 according to the determined moving route and traveling plan.

The map data may include object identification information on various objects disposed in a space (for example, a road) in which the vehicle 10 travels. For example, the map data may include object identification information on fixed objects such as streetlights, rocks, and buildings, and movable objects such as vehicles and pedestrians. In addition, the object identification information may include a name, a type, a distance, and a location.

In addition, the vehicle 10 may control a driving part on the basis of control/interaction of the user, thereby performing an operation or traveling. In this case, the vehicle 10 may acquire intent information of the interaction according to a motion or voice utterance of the user and determine a response on the basis of the acquired intent information to perform an operation.

According to an example embodiment, in addition to the functions such as the XR function and the V2X as the extended function, the extended function providing device 100 may implement various functions (for example, a surround view function, a rear view function, a side view function, a black box function, and real-time monitoring function), which may be provided by acquiring image information in an autonomous driving mode of the vehicle 10, in vehicle 10.

The AI technology may be applied to the extended function providing device 100, and the extended function providing device 100 may be implemented as an HMD, an HUD provided in the vehicle, TV, a mobile phone, a smartphone, a computer, a wearable device, a home appliance, digital signage, a vehicle, a fixed robot, or a mobile robot.

The extended function providing device 100 may analyze three-dimensional (3D) point cloud data or image data acquired through various sensors or from an external device to generate position data and attribute data on 3D points, thereby acquiring information on a surrounding space or a real object and rendering and outputting an XR object to be output. For example, the extended function providing device 100 may output an XR object including additional information on a recognized object to correspond to the recognized object.

The extended function providing device 100 may perform the above operations using a learning model consisting of at least one artificial neural network. For example, the extended function providing device 100 may recognize a real object from 3D point cloud data or image data using a learning model and may provide information corresponding to the recognized real object. Here, the learning model may be directly learned in the extended function providing device 100 or may be learned from an external device such as an AI server.

In this case, the extended function providing device 100 may generate a result using a direct learning model and perform an operation, and alternatively, may perform an operation by transmitting sensor information to an external device such as an AI server and receiving a generated result.

The AI technology and the XR technology are applied to the vehicle 10, and thus the vehicle 10 may be implemented as a mobile robot, a vehicle, or an unmanned aerial vehicle.

The vehicle 10 to which the XR technology is applied may refer to an autonomous vehicle equipped with a part for providing an XR image or an autonomous vehicle which is a target of control/interaction in the XR image. In particular, the vehicle 10, which is the target of the control/interaction in the XR image, is distinguished from the extended function providing device 100 and may be interworked with each other.

The vehicle 10 equipped with the part for providing an XR image may acquire sensor information from sensors including a camera and may output an XR image generated on the basis of the acquired sensor information. For example, the vehicle 10 may be equipped with a HUD to output the XR image, thereby providing an XR object corresponding to a real object or an object in a screen to an occupant.

In this case, when the XR object is output to the HUD, at least a portion of the XR object may be output so as to overlap the real object to which a gaze of the occupant is directed. On the other hand, when the XR object is output to the display provided in the vehicle 10, at least a portion of the XR object may be output to overlap the object in the screen. For example, the vehicle 10 may output XR objects corresponding to objects such as a lane, other vehicles, traffic lights, traffic signs, two-wheeled vehicles, pedestrians, and buildings.

When the vehicle 10, which is the target of the control/interaction in the XR image, acquires sensor information from sensors including a camera, the vehicle 10 or the extended function providing device 100 may generate an XR image on the basis of the sensor information, and the extended function providing device 100 may output the generated XR image. In addition, the vehicle 10 may operate on the basis of a control signal input through an external device such as the extended function providing device 100 or user interaction.

The above-described method of the present disclosure may be provided by being recorded in a computer-readable recording medium as a program for execution by a computer.

The method of the present disclosure may be executed through software. When executed in software, the component parts of the present disclosure are code segments which perform necessary tasks. The program or the code segments may be stored on a processor-readable medium.

The computer-readable recording medium includes all kinds of recording devices in which data readable by a computer system is stored. Examples of the computer-readable recording device include a read only memory (ROM), a random access memory (RAM), a compact disc (CD)-ROM, a digital versatile disc (DVD)±ROM, DVD-RAM, a magnetic tape, a floppy disk, a hard disk, and an optical data storage device. The computer-readable recording medium may also be distributed in a computer device connected via a network so that a computer-readable code may be stored and executed in a distributed manner.

The above-described present disclosure may be variously substituted, modified, and changed within the technical spirit of the present disclosure without departing from the scope by those skilled in the art to which the present disclosure pertains and is not limited to the above-described example embodiments and the accompanying drawings. In addition, the example embodiments described herein may not be limitedly applied and all or some of each embodiment may be selectively combined so that various modifications may be made.

The invention claimed is:

1. An apparatus for providing an extended function to a vehicle, the apparatus comprising:
a first photographing part configured to acquire first image information necessary to provide an extended function; and
a first electronic control unit (ECU) configured to perform image processing so as to provide the extended function on the basis of driving information acquired in relation to driving of a vehicle and first image information photographed through the first photographing part or provide an existing function by receiving, from an external system, information for performing the existing function which is performed by the external system including a second ECU,
wherein:
the first photographing part includes a red, green, blue (RGB) camera and an infrared camera; and
when an amount of ambient light of the vehicle is less than or equal to a predetermined amount of light, the first ECU determines to display the first image information including at least partial infrared image information photographed through the infrared camera and when the amount of ambient light of the vehicle is greater than the predetermined amount of light, the first ECU determines to display the first image information including RGB image information photographed through the RGB camera.

2. The apparatus of claim 1, wherein the first ECU is further configured to determine whether to provide the extended function on the basis of the first image information acquired through the first photographing part.

3. The apparatus of claim 1, wherein:
when the first ECU determines to not provide the extended function, the first ECU determines to display second image information acquired through at least one second photographing part for providing the existing function; and
when the first ECU determines to provide the extended function, the first ECU determines to display the first image information.

4. The apparatus of claim 3, wherein, when the first ECU determines to provide the extended function, the first ECU performs image processing so as to provide the extended function using the first image information and the driving information including at least one among navigation route data, global positioning system (GPS) data, dead reckoning (DR)-GPS data, and controller area network (CAN) data.

5. The apparatus of claim 1, wherein, when the amount of ambient light of the vehicle is less than or equal to a predetermined amount of light, the first ECU determines to display the first image information including the infrared image information photographed through the infrared camera and the RGB image information photographed through the RGB camera.

6. The apparatus of claim 5, wherein the first ECU determines to display the first image information which is synthesized such that the RGB image information is displayed around the infrared image information.

7. The apparatus of claim 6, wherein the first ECU performs the image processing such that the infrared image information is displayed in a portion in which a driving route of the vehicle is displayed.

8. The apparatus of claim 1, wherein the first ECU determines whether to perform the existing function or the extended function on the basis of a control signal received from the outside and determines to perform image processing for providing the extended function according to the determination on the basis of the driving information and the first image information photographed through the first photographing part or provide the existing function based on second image information acquired through at least one second photographing part.

9. The apparatus of claim 1, wherein, when the first image information is not acquired, the first ECU determines to display at least one of the driving information and the second image information acquired through the at least one second photographing part such that the existing function is performed.

10. The apparatus of claim 1, wherein the first ECU provides the extended function on the basis of the first image information through at least one of a head-up display (HUD) and an infotainment display.

11. The apparatus of claim 1, wherein the extended function includes at least one among virtual reality, augmented reality, mixed reality, vehicle to everything (V2X), and a monitoring function in an autonomous driving mode of the vehicle.

12. A method of providing an extended function to a vehicle, the method comprising:
acquiring first image information necessary to provide an extended function through a first photographing part;
acquiring predetermined driving information related to driving of the vehicle;
performing image processing through a first ECU so as to provide an extended function on the basis of the driving information and the first image information or provide an existing function by receiving, from an external system, information for performing the existing function which is performed by the external system including a second ECU;
displaying a result of the image processing;
when the amount of ambient light of the vehicle is less than or equal to an amount predetermined of light, determining to display the first image information including at least partial infrared image information photographed through an infrared camera; and
when the amount of ambient light of the vehicle is greater than the amount predetermined of light, determining to display the first image information including RGB image information photographed through an RGB camera.

13. The method of claim 12, further comprising:
determining, by the first ECU, whether to provide the extended function on the basis of the first image information acquired through the first photographing part.

14. The method of claim 13, wherein the determining of whether to provide the extended function includes:
when the first ECU determines to not provide the extended function, determining, by the first ECU, to display second image information acquired through at least one second photographing part for providing the existing function; and
when the first ECU determines to provide the extended function, determining, by the first ECU, to display the first image information.

15. The method of claim 13, wherein the determining of whether to provide the extended function includes, when the first ECU determines to provide the extended function, determining, by the first ECU, to display the first image information.

16. The method of claim 12, wherein the determining of displaying the first image information including the infrared image information includes, when the amount of ambient light of the vehicle is less than or equal to a predetermined amount of light, determining to display the first image information including the infrared image information photographed through the infrared camera and the RGB image information photographed through the RGB camera.

17. The method of claim 12, wherein the extended function includes at least one among virtual reality, augmented reality, mixed reality, V2X, and a monitoring function in an autonomous driving mode of the vehicle.

18. A non-volatile computer-readable recording medium in which a computer program for performing a method of providing an extended function of claim 12 is recorded.

* * * * *